Jan. 30, 1940.　　　V. MARIANNO　　　2,188,554
MARINE CRAFT LANDING AND LAUNCHING DEVICE
Filed Jan. 11, 1938　　8 Sheets-Sheet 1

VITO MARIANNO
INVENTOR.

BY　*Alexander Bleicher*
ATTORNEY.

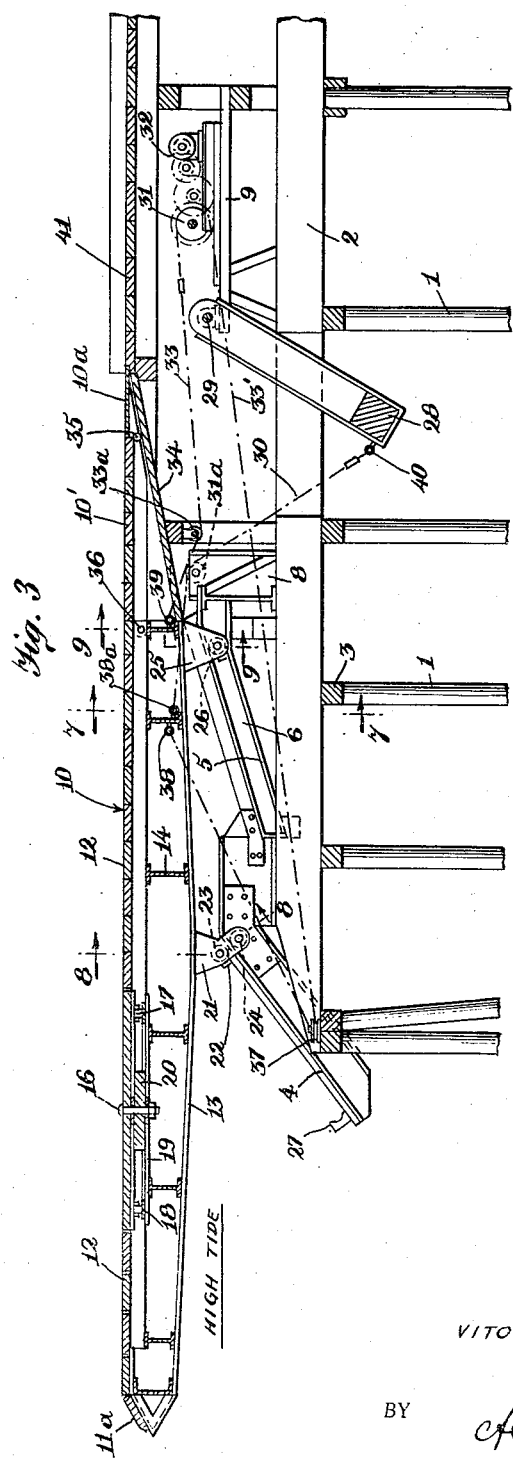

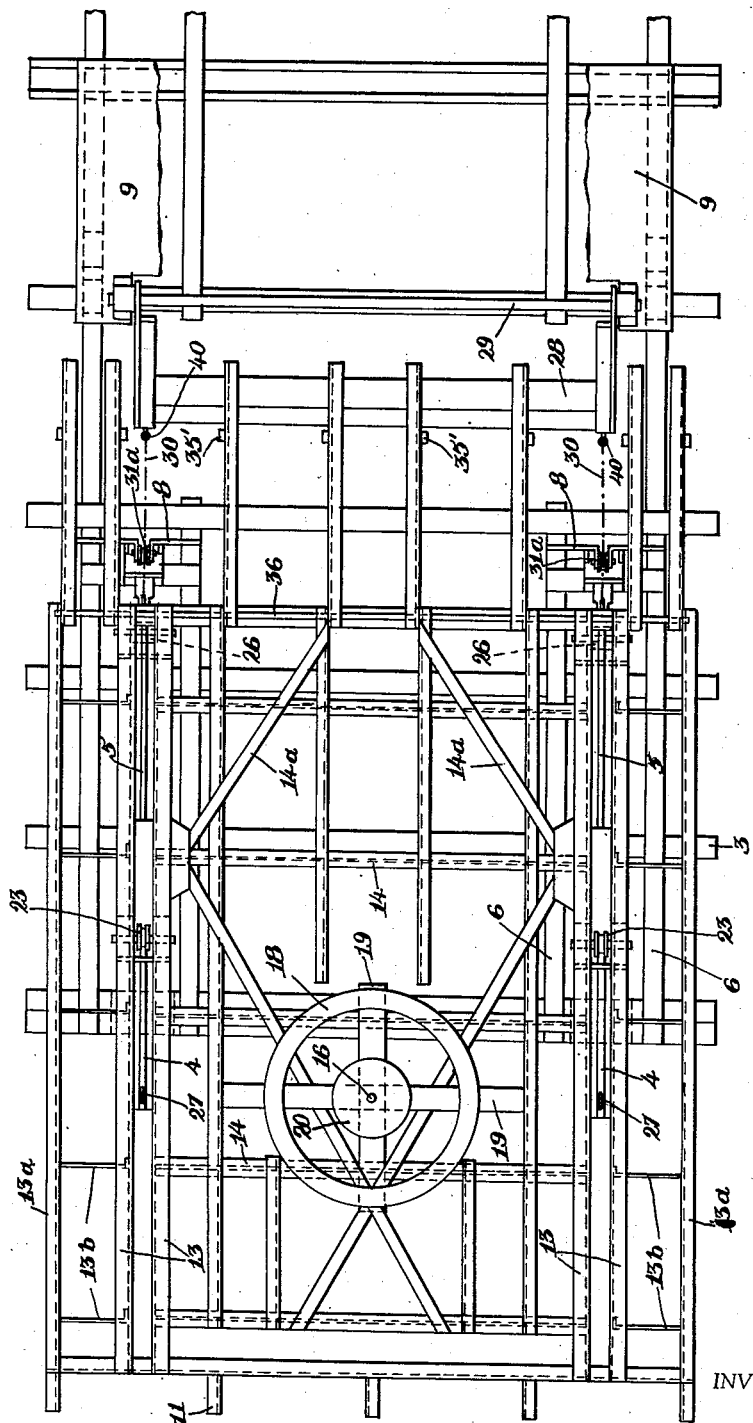

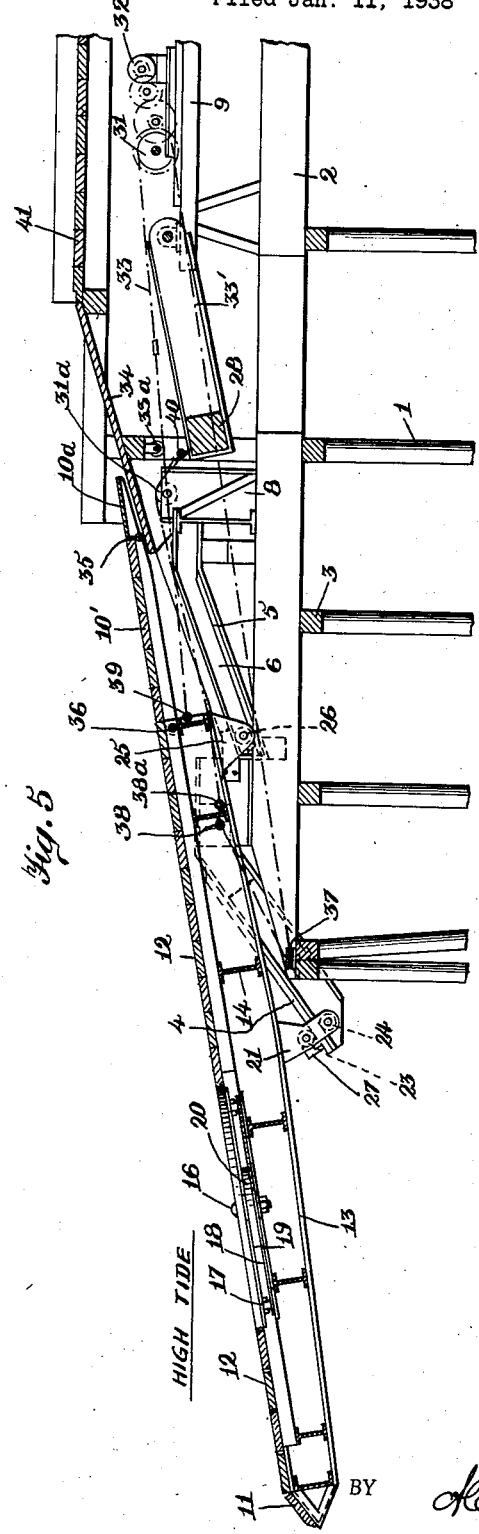

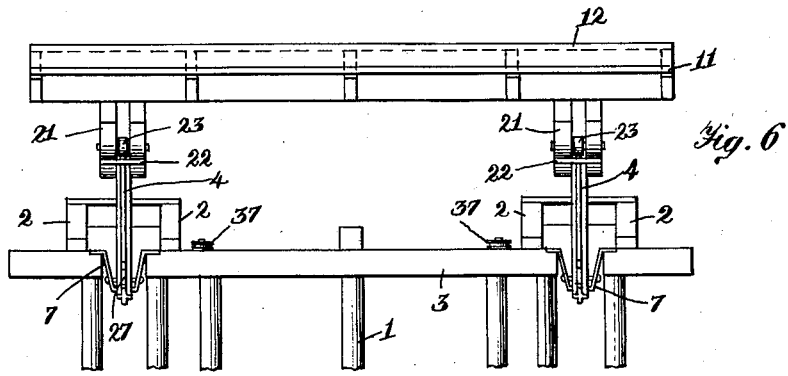
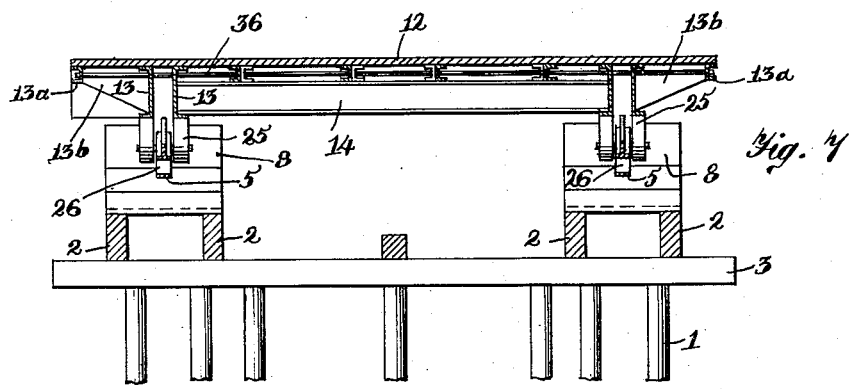
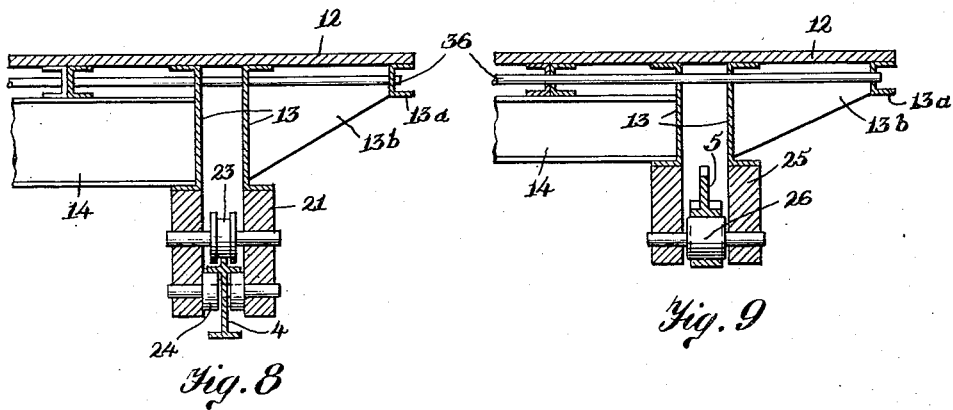

Jan. 30, 1940.  V. MARIANNO  2,188,554
MARINE CRAFT LANDING AND LAUNCHING DEVICE
Filed Jan. 11, 1938     8 Sheets-Sheet 6
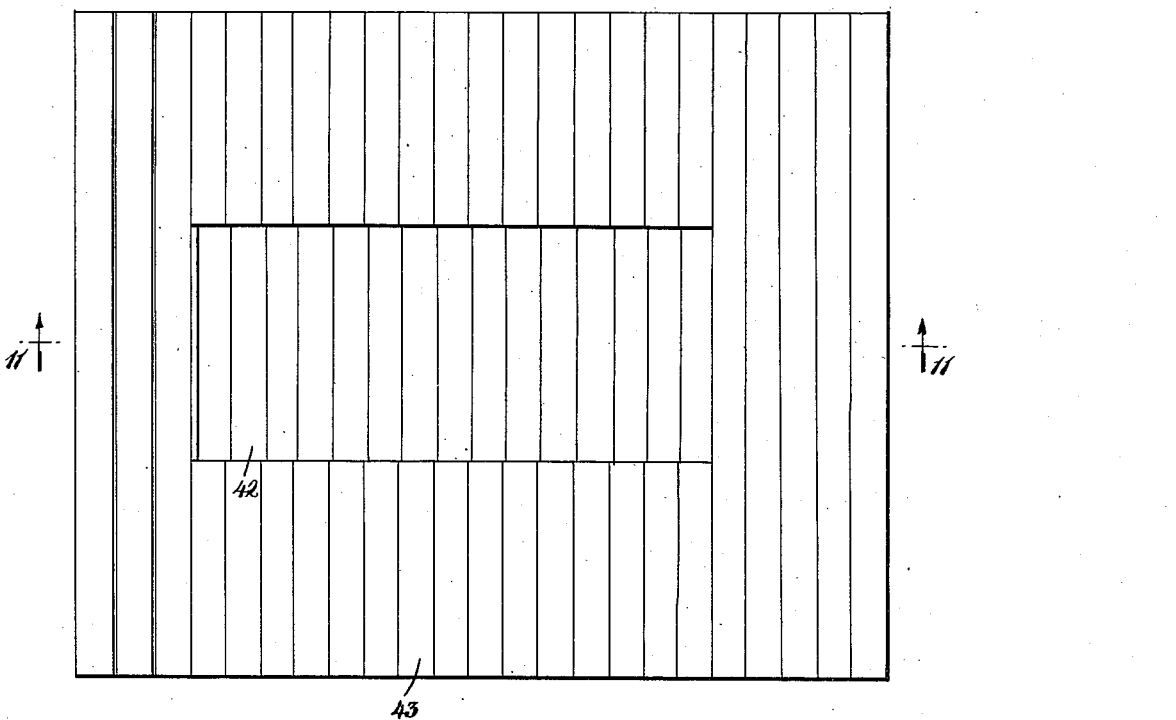
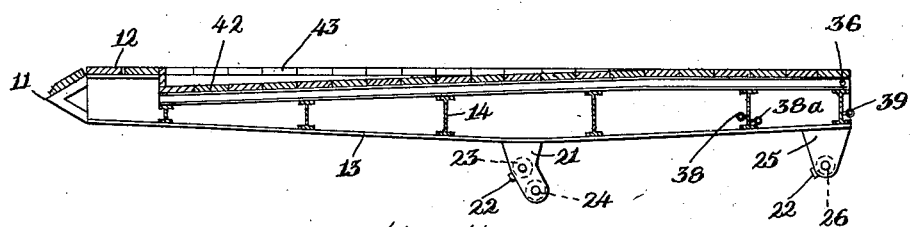
VITO MARIANNO
INVENTOR.
BY
ATTORNEY.

Jan. 30, 1940.　　　V. MARIANNO　　　2,188,554
MARINE CRAFT LANDING AND LAUNCHING DEVICE
Filed Jan. 11, 1938　　　8 Sheets-Sheet 7
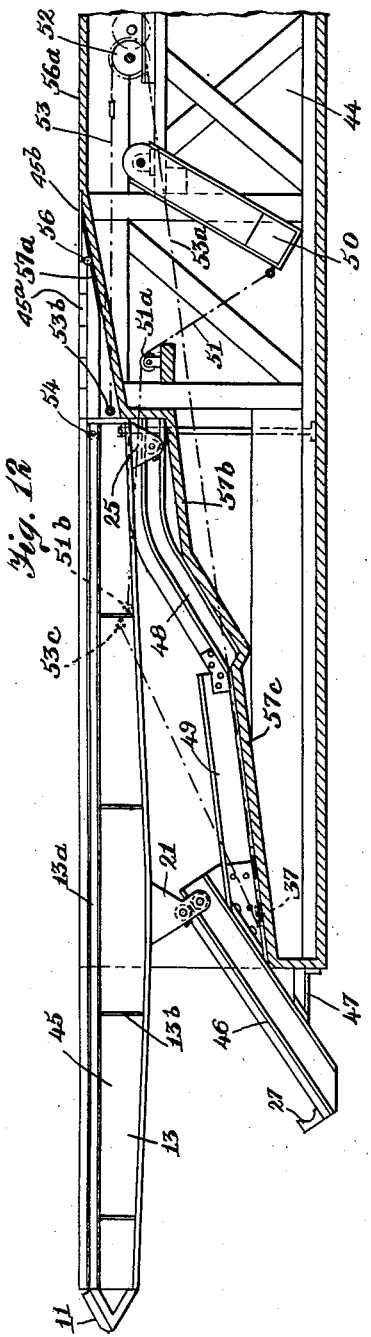
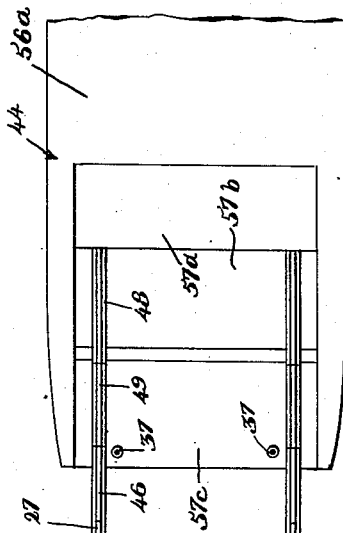
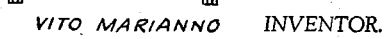
VITO MARIANNO INVENTOR.
BY
ATTORNEY.

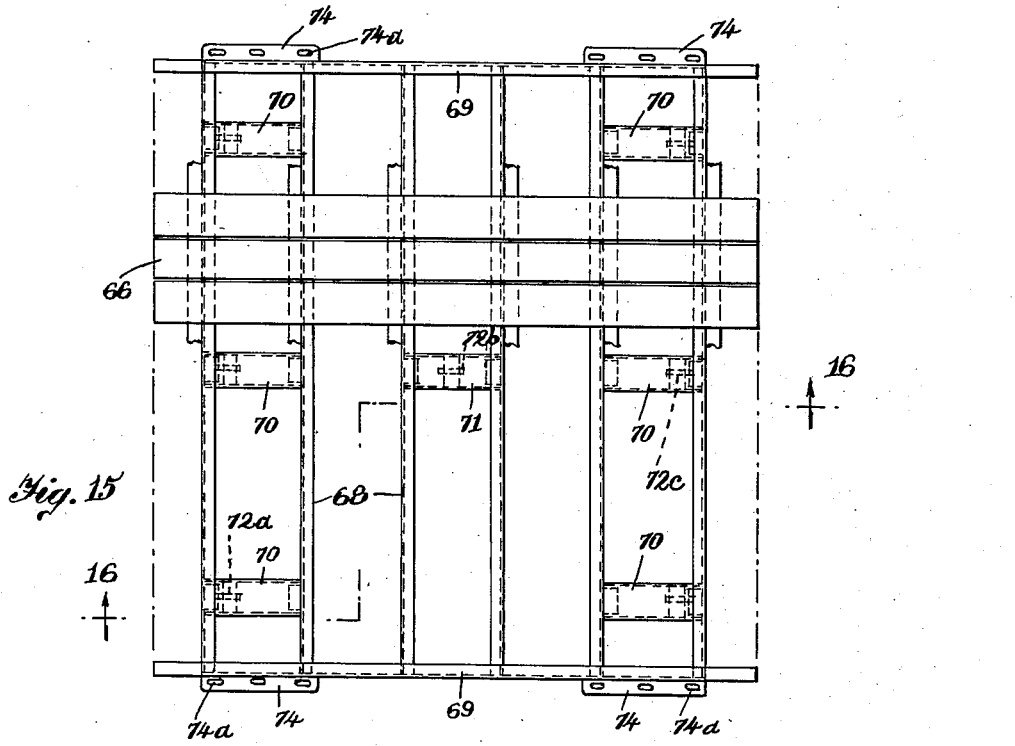
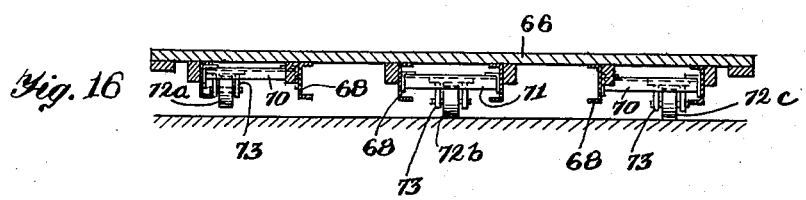
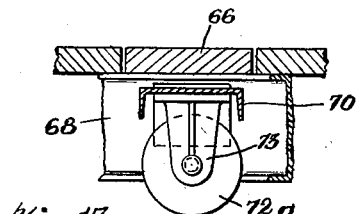
VITO MARIANNO INVENTOR.

Patented Jan. 30, 1940

2,188,554

UNITED STATES PATENT OFFICE 2,188,554

MARINE CRAFT LANDING AND LAUNCHING DEVICE

Vito Marianno, New York, N. Y.

Application January 11, 1938, Serial No. 184,404

9 Claims. (Cl. 114—43.5)

This invention relates generally to simplified and efficient landing and launching facilities for marine craft, but more specifically to a stationary stage forming part of a pier, stationary platform adjacent the sea, floating platform, boat or barge, the said stage having a shiftable carriage portion secured to lower guide rails whereby the carriage portion is displaceable relative to the stage in order to enable an hydroplane or other marine craft to navigate from the water directly on to the said stage or to be launched into the water from the said stage.

The main object of the invention resides in the provision of an economical, compact, sturdy, weather-proof and practical ramp for landing and launching marine craft, the said ramp having a forward extension in the form of a shiftable carriage, counterbalanced, controlled and operated along and from below the surface of the stage portion of the ramp.

Another object of the invention resides in the provision of a landing and launching ramp for marine craft especially adaptable for easy and permanent affixation to a barge or ship having a deck, the said deck forming the stationary stage portion of the ramp, and the shiftable carriage portion secured below the deck cooperating therewith and forming a horizontal and coextensive extension of the ship deck shiftable into the water for operative purposes and in no way interfering with the normal course of travel of the said barge or ship when in horizontal position.

A further object of the invention resides in the provision of a landing and launching ramp for marine craft which is comparatively light in weight, wherein the weight thereof is properly distributed in its attachment to a platform or deck of a ship for preserving the center of gravity of the latter, and wherein the shiftable portion of the ramp or carriage is mechanically controlled from and rides below the surface of the platform or deck.

These objects and other incidental ends and advantages of the invention will hereinafter appear in the progress of the disclosure and as pointed out in the appended claims.

Accompanying this specification are drawings showing preferred forms of the invention, wherein corresponding reference characters designate corresponding parts throughout the several views and wherein:

Figure 3 is a longitudinal sectional view of Figure 1 along the plane 3—3 thereof.

Figure 4 is a top plan view of the ramp similar to Figure 1 showing the floor removed and exposing the frame-work therefor.

Figure 5 is a longitudinal sectional view of the ramp showing the carriage portion in tilted and operative limiting position, in contradistinction to the ramp shown in elevated position in Figure 3.

Figure 6 is a front view in elevation of Figure 3.

Figure 7 is a transverse sectional view of Figure 3 along the plane 7—7 thereof.

Figure 8 is a sectional view of Figure 3 along the intersecting planes 8—8 thereof.

Figure 9 is a transverse sectional view of Figure 3 through the planes 9—9 thereof.

Figure 10 is a plan view of the movable carriage portion of the ramp showing a pit therein for a truck or dolly.

Figure 11 is a longitudinal sectional view of Figure 10 along the plane 11—11 thereof.

Figure 12 is a longitudinal view of a ramp showing the latter secured to a portion of a ship shown in cross-section.

Figure 13 is a top plan view of Figure 12 showing the ramp removed.

Figure 14 is a longitudinal view of a modified form of a ramp showing the latter secured to a portion of a ship shown in cross-section.

Figure 15 is a top plan view of a turnable dolly truck used in association with a pit in the movable carriage portion of the ramp.

Figure 16 is a transverse sectional view of Figure 15 through the planes 16—16 thereof.

Figure 17 is an end view partly in section showing the manner of affixation of the turnable dolly truck wheels thereto.

Figure 1:
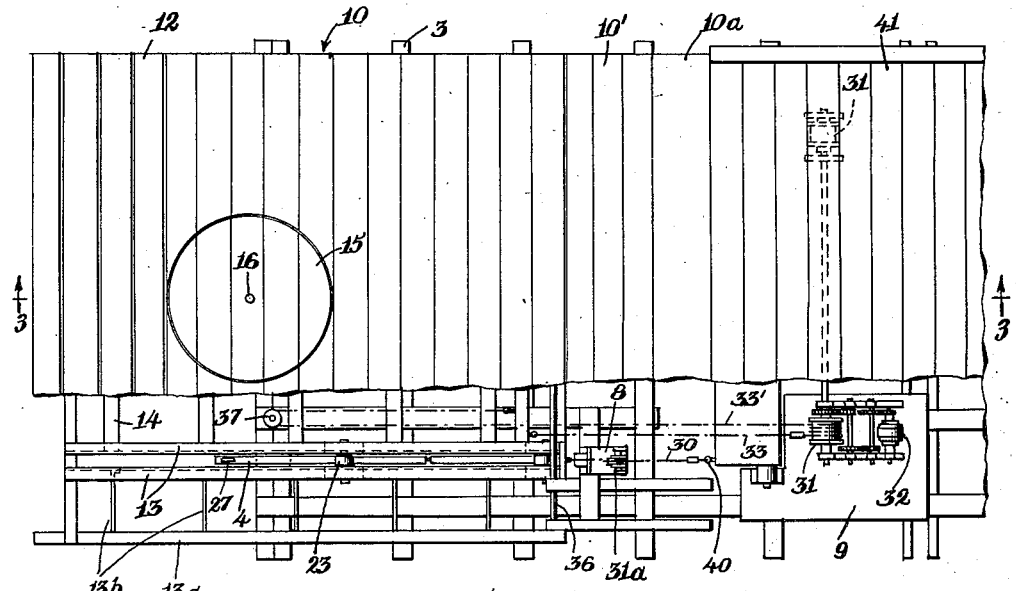
Figure 1 is a top plan view of the ramp showing a turn-table in the movable or carriage portion and showing a portion of the ramp floor partly cut-away, the ramp as shown being supported on pier piles, and in raised and inoperative position.

In accordance with the invention and in accordance with the preferred forms thereof shown in the drawings, the ramp on which the hydroplane or other marine craft is destined to land or be launched from consists of essentially two portions, a rear stationary portion which is fixed to or forms part of a platform mounted on a pier, a float or the deck of a ship and a forward portion in the form of a movable carriage forming a horizontal elongation of the stationary portion of the ramp.

Figure 2:
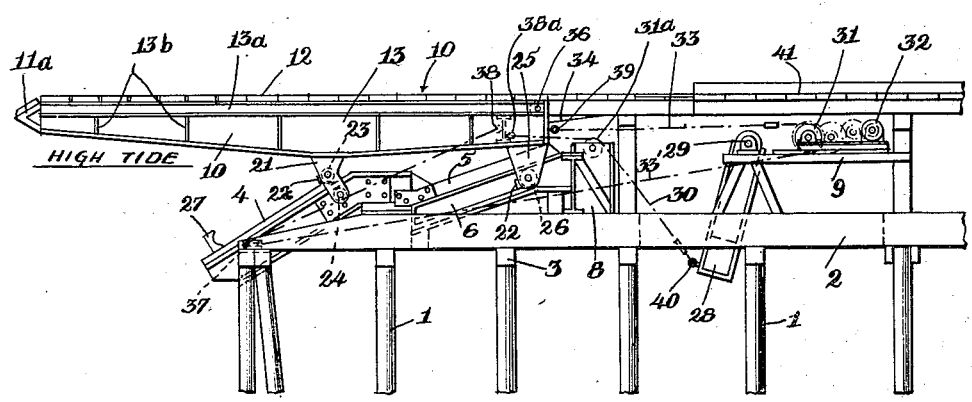
Figure 2 is an end view in elevation of Figure 1.

Figures 1 to 11 inclusive show a ramp specifically adapted for the landing of marine craft such as hydroplanes on a pier end, the ramp consisting essentially of a stationary or fixed portion and a movable carriage portion, the fixed portion forming the end of an existing pier of the usual construction altered by the addition and installation of operating accessories while the movable carriage portion or apron normally forms an horizontal elongation of the fixed portion or stage. When the apron is in the aforesaid horizontal position, it forms a flush runway with the fixed stage but is also capable of a forwardly tiltable movement toward the water level over a sloping track system on which the said carriage rides, the forward movement being accompanied by detachment from the fixed stage or ramp. The carriage in its detached position is suspended and operated by a system of cables and sheaves, or in the alternative operates on a positive drive system with worms and gears.

Because of the apron's capability of assuming a tilting position with the forward portion thereof submerged in the water, the apron in conjunction with the fixed stage is designated as a variable slope ramp. The variable slope ramp is capable of being installed on a platform adjacent the sea other than one supported on a pier end and is also capable of being installed on a float, ship or barge. Thus, Figures 12 and 13 show the variable slope apron forming standard equipment with a barge, while Figure 14 shows a modified form of a variable slope apron wherein the latter is given a forwardly tilting movement from a hinge, the operating mechanism all being below the surface of the apron.

Thus, the variable slope apron in Figures 1–11 inclusive is supported on an inclined or sloping track system secured to a conventional framework built on pier piles 1, the said framework including the usual transverse stringers 3 and pairs of lateral main beams 2 secured thereto. The inclined track system is fixedly held and supported by the framework in any suitable manner known to those skilled in the art of steel construction, the track system comprising a properly spaced pair of preferably aligned forward and rear track members 4 and 5 respectively.

The variable slope or movable apron, generally designated by numeral 10, is slidably or ridably secured to the said track members 4 and 5 whereby the apron 10 is forwardly tiltable as will hereinafter appear, the forward or lower track members 4 projecting below the main upper surface of the framework and being secured to the latter by means of supporting saddles 7 as best shown in Figure 6 of the drawings.

Essentially, apron 10 consists of an upper wooden platform or floor 12 supported by a skeleton steel frame. The steel frame includes a pair of spaced lateral main channel beams 13 on each side associated with cross girders 14 and truss elements 14a. In addition, terminal lateral channels 13a are secured to the main channel beams 13 and are supported by means of brackets 13b while beams 11 jut forwardly of the skeleton steel frame for affixation thereto of an apron nose 11a.

Figures 1, 3, 4 and 5 show apron 10 provided with a turntable 15 coplanar with floor 12 and having a central pivot 16 and rollers 17 running on a circular track 18, the latter being supported by cross beams 19 on the skeleton frame. Spacer 20 is disposed between the turntable 15 and the beams 19 for the usual purposes. Where desirable, and as shown in Figures 10 and 11, an apron 43 equivalent to 10 is provided with a central depression or pit 42 adapted to receive a dolly, hereinafter to be described, which forms a low rotatable truck on which marine craft such as an hydroplane alights while on the water when the apron 43 is in tilted position.

Each pair of spaced main channel beams 13 of the apron skeleton frame is provided with depending forward and rear brackets 21 and 25, the forward brackets 21 serving as hangers for the journalling of rollers 23 and 24 spaced one above the other to engageably secure the opposite bearing surfaces of tracks 4, while the rear brackets 25 serve as hangers for the journalling of rollers 26, the latter engaging the spaced bearing surfaces of tracks 5 in the spacings 6 therebetween. In this way, the front and rear portions of apron 10 are secured against upward displacement from tracks 4 and 5 when the said apron is either horizontal or tilted. The brackets 21 and 25 are provided with conventional scrapers 22 for tracks 4 and 5 for the usual reasons.

The inclined or sloping track system is fixedly held and supported by the framework on pier piles 1 in any suitable manner known to those skilled in steel construction. Where desirable, a counterweight 28 may be secured to apron 10 to lessen the torque thereof when either in horizontal or tilted position, the said counterweight being supported on a rear platform 9 of the pier framework and swinging below the framework as will hereinafter appear.

It is understood, of course, that the steel skeleton frame of apron 10 and the framework built on pier piles 1 are only illustrative, and may be greatly changed and modified according to conditions and the choice of designers, but they must be strong enough to support the necessary loads. For example, the apron should be able to support a hydroplane which has to be lifted from the water level to the pier deck or fixed platform level 41, at a height preferably of at least five feet.

When apron 10, as shown in Figure 5, apron 45 in Figure 12 and apron 58 of barge 57 shown in Figure 14, are tilted, an easily accessible slope such as twelve and one-half degrees should result for the landing or launching of the marine craft, hydroplane or amphibian chassis. To accomplish the aforesaid inclination or slope, track members 4 and 5 must each have different slopes, tracks 4 having a greater angle of inclination than tracks 5.

Apron 10 is normally adapted to form a horizontal elongation with the pier deck or stationary platform 41 on the pier framework. Platform 41 is provided with a downwardly inclined apron or slope 34 along which a tail apron 10' having a suitable skeleton frame, is supported, the said tail apron being secured to apron 10 at hinge or pivot 36 and moving on rollers 35 secured to bearings 35' when apron 10 is moved downwardly and retracted.

Any suitable method may be used to project the apron into tilted position and to retract the same to horizontal position. Thus, propelling and retracting mechanism may be in the form of wire cables operated from a winch 31 and motor 32 situated on the pit or platform 9. On the other hand, a plurality of threaded shafts, jointed near the lower ends and pivotally and rotatably connected at the ends to the rear end of the apron, may engage power driven nuts fixedly secured to the pier framework below the stationary platform 41 whereby the apron is provided with a positive drive system for tilting and retracting along the inclined tracks.

However, as shown, apron 10 is operated by a wire cable winch 31 installed on a rear platform 9, the latter being situated below the stationary platform 41. Winch 31 is driven by any type of motor 32 and must be of sturdy construction and geared for a substantial draw-bar pull or lifting capacity. The hoisting system is of the conventional type including apron cables 33 and 33' fastened to the winch 31 and wound around in opposite directions. Cables 33 proceed from winch 31, pass over wheels 33a, and are secured to the rear of apron 10 at anchors 39, while cables 33' proceed forwardly and engage rollers or pulleys 37 secured to the forward portion of the pier framework, the said cables 33' proceeding from rollers 37 to anchors 38 secured to the apron skeleton frame all as best shown in Figures 2, 3, 5 and 12.

Cables 30 are secured to the lower end of counterweight 28 at anchors 40 and pass over wheels 31a journalled in a suitable support 8 on the pier framework, the said cables 30 proceeding toward the rear of the apron frame and being secured thereto by means of anchors 38a.

When winch 31 proceeds in a counterclockwise direction, the apron 10 is released and proceeds downwardly along tracks 4 and 5 until the apron acquires full tilting position preferably at a pitch of twelve and one-half degrees. At this angle, the forward part of apron 10 becomes submerged in the water to a depth of preferably five feet, the length of apron submerged being trigonometrically calculated at about 23.15 feet. At the same time that apron 10 is released downwardly, counterweight 28 depending from pivot 29 is pulled forwardly and upwardly therewith through the action of counterweight cables 30 secured to the apron frame at anchors 38a. Thus, the counterweight slackens or adds a load against the downward progress of apron 10.

At this point it should be observed that high and low tides affect the position of aprons secured to a fixed platform or stage beyond and adjacent to the water edge other than a ship, barge or float. The free board distance on a ship, barge or float, on the other hand, is constant regardless of high and low tides. In the case of the pier type of ramp, however, the water level is variable relative to the stationary platform and the nose of the apron is regulated in its downward movement so that it will be about five feet below the water level at either low or high tides. Where there is a difference of three feet between high and low tides, the apron has to be lowered along tracks 4 and 5 for a perpendicular drop of three feet for the apron nose so that the latter will still be five feet below the water level, tracks 4 and 5 still maintaining the preferable angle of inclination of twelve and one-half degrees. Such a drop entails the use of an apron of greater overall length and greater track length which may be easily calculated. For example, if an apron has overall dimensions of thirty feet by forty-eight feet, with a sloped apron 34 of fifteen feet for a 5½ foot distance between the water level and the fixed platform and a five foot submergence of the nose below the water level, 23.15 feet of apron will be submerged while the remainder will be above water level. For an eight foot distance between the water level at low tide and platform 41, the apron will have to be considerably lowered since the distance between the water level and platform 41 along the apron would be approximately 37.39 feet. Even in the latter case an apron of overall length of 48 feet would be sufficient provided that the sloped apron 34, supporting the tail apron portion 10, would have adequate length.

When the winch proceeds in a clockwise direction, the apron 10 is pulled up along tracks 4 and 5 while the counterweight 28 recedes thereby aiding in the draw of the apron upwardly along the said tracks.

Between the cables on the drum of winch 31 there should always be at least one and one-half turns of empty grooves to prevent entanglement. Conventional operating refinements such as an electric brake and an auxiliary manual brake for checking excessive speed when the apron is lowered in addition to a reversing winch drum type of controller having at least six points of speed regulation in both directions of drum rotation, and a limit switch mounted on and driven from the winch drum shaft adapted to automatically shut off the current for extreme positions of travel in both directions of rotation should be provided for the winch operation, although these parts have not been shown on the drawings. The drawings do show, however, end stops 27 secured at the lower ends of tracks 4 and 46.

Pin 36 connecting apron 10 and tail apron 10' is used to permit the formation of a temporary angle thereat caused by the difference in slope therebetween when apron 10 proceeds along tracks 4 and 5 and tail apron portion 10' rides on slope 34 by means of rollers 35 until either a tilting position of twelve and one half degrees results or the aprons 10 and 10' are coextensively horizontal. Moreover, an extension 10a proceeds from tail apron 10' so that the latter forms a flush junction with the stationary platform 41 when in either tilted or horizontal position so that it becomes possible for an amphibian to taxi up the tilted apron on its own power to reach the fixed platform when necessary.

The variable slope ramp hereinabove described is shown in Figures 12, 13 and 14 as applied to a barge or the deck of a ship, the barge or ship being used to supply the stationary platform equivalent to platform 41. Thus, numeral 44 indicates an ordinary barge having an end thereof preferably altered to furnish a downwardly sloped supporting surface 57a adjacent to the horizontal portion of deck 56a. Surface 57a has a sloped intermediate portion 57b and a sloped lowermost portion 57c, the portions 57b and 57c serving as supports for the inclined track system in conjunction with a bracket 47 supporting tracks 46 on the outer end of barge 44.

The track system for the ship, barge or float is similar to that shown in Figures 1-11 inclusive and comprises a pair of upper rails 48 connected to a pair of lower and forward rails 46 by means of connecting beams 49. A counterweight 50 is connected by means of cables 51 to the apron 45, the said cables 51 running around pulleys 51a supported on the rear end of the intermediate surface 57b and terminating at anchors 51b secured to apron 45. A winch 52 is supported on platform 44a, the latter being below the level of barge deck 56a, the said winch 52 having cables 53 and 53a emanating therefrom, cables 53 being secured to the rear portion of apron 45 at anchors 53b while cables 53a proceed around rollers 37 on surface 57c and return to anchors 53c secured to apron 45. The apron 45 has a tail apron 45a secured thereto by a pin 54, rollers 56 on the undersurface of apron 45a riding along the sloping surface 57a for purposes hereinbefore set forth. A connecting plate 45b of tail apron 45a engages flushly with deck 56a for reasons also hereinbefore set forth.

In Figure 13, the barge 44 is shown in plan with apron 45 removed therefrom, sloping surfaces 57b and 57c supporting tracks 48, beams 49 and tracks 46. The said tracks and beams appear as two continuous lateral arms projecting forwardly in an end processed portion of barge 44, the said end portion being so worked as to permit apron 45 to form a horizontal extension with deck 56a of barge 44 when in inoperative position and to permit a tilting pitch of twelve and one half degrees when the apron is inclined. Pairs of beams may easily be substituted for surfaces 57a, 57b and 57c if desirable.

In altering barge or ship 44 for the mounting thereon of apron 45, about 10 tons of material are removed for attachment of a ramp weighing approximately 18 tons and being thirty by forty-eight feet in size, which is a desirable size and weight to accommodate a ten or even twenty ton hydroplane or amphibian. Moreover, since the ramp and accessories amount to such a weight, it is practical in most instances to provide counterweights as described to offset the force of the torque on the projecting part of the apron. Of course, ballast on the opposite side of the ship or any other expedient may be invoked for lighter and heavier ramps and lighter and heavier craft.

Figure 14 shows a barge 57 with an apron 58 affixed thereto, the said apron 58 being movable about a pivot 65 at the end of deck 57d and having a perpendicular extension 59 forwardly of the barge and clearing the same whether the apron is in horizontal or inclined position. Extension 59 has anchors 60 at the lower ends to which are secured cables 62a running upwardly and around rollers or pulleys 62 affixed to the forward part of the barge 57 at the end of sloping apron portion 62b of barge deck 57d. The said cables 62a proceed from pulleys 62 to rollers 63 affixed to motor 64 and terminate in a counterweight 61, the rollers 63 and motor 64 being secured to barge 57 below deck 57d.

Thus, by making rollers 63 rotate in a clockwise direction, apron 58 is brought up to the level of the stationary platform or deck 57d while the said apron 58 tilts downwardly when the motor 63 is rotated in a counterclockwise direction and is brought to rest on sloping apron portion 62b, the latter having an angle of inclination of preferably twelve and one-half degrees. The sloping apron portion 62b may well be in the form of a pair of spaced inclined beams if desired.

In Figures 15, 16 and 17 a rotatable dolly construction is shown and is adapted to engage with the inclined pit 42 of the apron 43 shown in Figures 10 and 11, the said dolly having a flooring 66 with the same slope as pit 42, thereby becoming coplanar with the flooring of apron 43 when the dolly is in full position within the said pit. The dolly frame is composed preferably of three pairs of longitudinal channels 68 connected by two channel headers 69. Three parallel braces 70 run across the outside pairs of longitudinal channels 68, while 71 indicates a central brace running across the middle pair of channels 68.

Wheels are mounted on each of the braces by means of hangers 73, but wheels 72a mounted on braces 70 along one outer pair of longitudinal channels 68 are mounted higher or nearer to the flooring 66 than wheels 72c mounted along the opposite outer pair of channels 68, while central wheel 72b is rotatably mounted and at preferably the same distance from flooring 66 as wheels 72c. In this way, the dolly tilts to acquire the angle of the pit 42 and may also be rotated about central wheel 72b. Brackets 74 and apertures 74a therein are affixed to the dolly for fastening cables and ropes thereto for pulling the dolly out of pit 42.

A hydroplane is moved when on an apron having a dolly or turntable by lifting the apron to a coextensive horizontal position with the fixed platform of either a boat, barge deck or a platform supported on pier piles. The turntable is used to rotate the hydroplane for purposes of launching, while the dolly is used to transport the plane from the apron to either the ship or a landing base and vice versa. As described, however, the dolly is also capable of acting as a turntable.

The construction of a tiltable apron forming part of a ramp as applied to a stationary stage either in the form of a boat deck, float deck or platform on a pier has great advantages over the conventional sea plane ramps in present day use. The operating gear for the apron is entirely below the surface of the running space of the ramp and is thus concealed and protected from weathering. In addition, the ramp in no way interferes with the natural travel of the ship when in projecting horizontal position, although it is possible even to do away with the projecting horizontal apron by providing tracks on the boat deck to draw the apron inwardly of the deck limits. Moreover, the attachment of the ramp to a ship does not result in any appreciable tilting even with the load of a hydroplane thereon for the reason that in providing the mounting means for the ramp on a barge or ship, about ten tons of material are removed before the ramp tonnage is added. On the normal boat, a thirty-ton weight on an end will cause a listing of about three inches which is more or less negligible and may easily be overcome by the conventional means.

Choice of materials used in the construction of parts is very wide. Non-corroding and durable metals and alloys may be used for the operative and submerged parts. For instance, the forward tracks supporting the apron, the apron itself, and the apron wheels, are all subject to sea corrosion. In addition, the hoisting or positive drive systems are exposed to weathering conditions.

In utilizing the new constructions above described, a new method of landing and launching marine craft has incidentally been developed. For landing, an apron adjacent a fixed platform is lowered at an angle into the sea, a hydroplane is taxied to the water area directly above the submerged portion of the apron, the apron is raised with the hydroplane thereon until the said apron forms a horizontal extension with the fixed platform, and finally the hydroplane is transported from the apron to the platform. The launching of marine craft is similarly accomplished by moving it onto the apron when the latter is in horizontal position, then the apron is tilted into the sea whereby the craft is floated on the area of the water directly above the submerged part of the apron, and finally the craft taxies into the sea.

I claim:

1. A variable slope marine craft landing and launching device comprising a horizontal stage portion and an inclined end portion, an understructure therefor, a set of forward and inclined tracks and a rear set of inclined tracks at a higher level, at a different angle and terminating in horizontal portions, the said tracks being secured to said understructure, a movable carriage normally horizontally coextensive with the said stage portion and having supporting and depending wheels secured to said tracks, the rear end of said carriage being movably supported on said inclined end portion, means below the movable carriage to project and tilt the same whereby the forward landing and launching end thereof is immersed below the water line, the water thereabove forming the landing and floating area for a craft adapted to be scooped up and launched respectively, the carriage in such projected position in cooperation with the inclined end portion forming a continuous runway with the said stage portion, the said means also being adapted to lift and straighten the said carriage carrying the craft to a horizontal and coextensive position with the said stage.

2. A variable slope marine craft landing and launching device comprising a pier adjacent a waterway and having an inclined end portion facing the waterway, an understructure therefor, a set of forward and inclined tracks and a rear set of inclined tracks at a higher level, at a different angle and terminating in horizontal portions, the said tracks being secured to said understructure, a movable carriage normally horizontally coextensive with the said pier and having supporting and depending wheels secured to said tracks, the rear end of said carriage being movably supported on said inclined end portion, means below the movable carriage to project and tilt the same whereby the forward landing and launching end thereof is immersed below the water line, the water thereabove forming the landing and floating area for a craft adapted to be scooped up and launched respectively, the carriage in such projected position in cooperation with the inclined end portion forming a continuous runway with the said pier, the said means also being adapted to lift and straighten the said carriage carrying the craft to a horizontal and coextensive position with the said pier.

3. A variable slope marine craft landing and launching device comprising an open ship deck, an inclined stern portion, a set of forward and inclined tracks and a rear set of inclined tracks at a higher level, at a different angle and terminating in horizontal portions, the said tracks being secured to the outer end of said inclined stern portion, a movable carriage normally horizontally coextensive with the said deck and having supporting and depending wheels secured to said tracks, the rear end of said carriage being movably supported on the upper end of said inclined stern portion, means below the movable carriage to project and tilt the same whereby the forward landing and launching end thereof is immersed below the water line, the water thereabove forming the landing and floating area for a craft adapted to be scooped up and launched respectively, the carriage in such projected position in cooperation with the upper end of the inclined stern portion forming a continuous runway with the said deck, the said means also being adapted to lift and straighten the said carriage carrying the craft to a horizontal and coextensive position with the said deck.

4. A variable slope marine craft landing and launching device as set forth in claim 1 wherein the forward landing and launching end of the movable carriage is provided with a turntable, whereby the craft may be turned.

5. A variable slope marine craft landing and launching device as set forth in claim 1 wherein the forward landing and launching end of the movable carriage is provided with a combined turntable and dolly.

6. A variable slope marine craft landing and launching device as set forth in claim 2 wherein the forward landing and launching end of the movable carriage is provided with a turntable, whereby the craft may be turned.

7. A variable slope marine craft landing and launching device as set forth in claim 2 wherein the forward landing and launching end of the movable carriage is provided with a combined turntable and dolly.

8. A variable slope marine craft landing and launching device as set forth in claim 3 wherein the forward landing and launching end of the movable carriage is provided with a turntable, whereby the craft may be turned.

9. A variable slope marine craft landing and launching device as set forth in claim 3 wherein the forward landing and launching end of the movable carriage is provided with a combined turntable and dolly.

VITO MARIANNO.